US008407253B2

(12) United States Patent
Ryu et al.

(10) Patent No.: US 8,407,253 B2
(45) Date of Patent: Mar. 26, 2013

(54) APPARATUS AND METHOD FOR KNOWLEDGE GRAPH STABILIZATION

(75) Inventors: Pum Mo Ryu, Daejeon (KR); Myung Gil Jang, Daejeon (KR); HyunKi Kim, Daejeon (KR); YiGyu Hwang, Daejeon (KR); Soojong Lim, Daejeon (KR); Jeong Heo, Daejeon (KR); Chung Hee Lee, Daejeon (KR); Hyo-Jung Oh, Daejeon (KR); Changki Lee, Daejeon (KR); Miran Choi, Daejeon (KR); Yeo Chan Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 12/877,063

(22) Filed: Sep. 7, 2010

(65) Prior Publication Data

US 2011/0137919 A1 Jun. 9, 2011

(30) Foreign Application Priority Data

Dec. 9, 2009 (KR) ................. 10-2009-0121578

(51) Int. Cl.
*G06F 17/30* (2006.01)
(52) U.S. Cl. ........................ 707/790; 707/798
(58) Field of Classification Search .......... 707/790, 707/798
See application file for complete search history.

(56) References Cited

U.S. PATENT DOCUMENTS

| | | | | |
|---|---|---|---|---|
| 6,112,203 | A * | 8/2000 | Bharat et al. ........................ | 1/1 |
| 6,801,909 | B2 * | 10/2004 | Delgado et al. ..................... | 1/1 |
| 7,117,206 | B1 * | 10/2006 | Bharat et al. ........................ | 1/1 |
| 7,194,466 | B2 * | 3/2007 | Chen et al. ........................... | 1/1 |
| 7,281,005 | B2 * | 10/2007 | Canright et al. ..................... | 1/1 |
| 7,289,985 | B2 * | 10/2007 | Zeng et al. .................... | 707/749 |
| 7,305,389 | B2 * | 12/2007 | Zeng et al. .................... | 707/721 |
| 7,624,081 | B2 * | 11/2009 | Zhao et al. ...................... | 706/20 |
| 7,809,548 | B2 * | 10/2010 | Mihalcea et al. ................. | 704/1 |
| 8,122,030 | B1 * | 2/2012 | Harinarayan et al. ......... | 707/748 |
| 2002/0052873 | A1 * | 5/2002 | Delgado et al. ................... | 707/7 |
| 2004/0220963 | A1 * | 11/2004 | Chen et al. ............... | 707/103 R |

(Continued)

FOREIGN PATENT DOCUMENTS

| | | |
|---|---|---|
| JP | 2003-196194 A | 7/2003 |
| KR | 1020090051612 A | 5/2009 |

OTHER PUBLICATIONS

Bettina Hoser et al., "Semantic Network Analysis of Ontologies", The Semantic Web: Research and Applications, 3rd European Semantic Web Conference, Jun. 11-14, 2006, 2006 Proceedings, Lecture Notes in Computer Science, ESWC, Budva, Montenegro.

(Continued)

*Primary Examiner* — Baoquoc N To

(57) ABSTRACT

A method for stabilizing a knowledge graph includes: generating a knowledge graph in which same entities in a semantic relation list between entities provided as an input are represented as a single node based on names and types of the entities; computing, on the knowledge graph, semantic similarities between all potential entity pairs of same entity types by comparing, for each potential entity pair, a type of relation associated with an entity in the entity pair and an opponent entity to the entity; and selecting, based on the semantic similarities, a representative entity from each of semantically similar entity pairs on the knowledge graph and integrating an opponent entity to the representative entity into the representative entity. The method further includes computing relation weighted values between the entities by using a graph analysis and statistic information, and adding the weighted values to the knowledge graph.

20 Claims, 9 Drawing Sheets

U.S. PATENT DOCUMENTS

| | | |
|---|---|---|
| 2005/0086222 A1 | 4/2005 | Wang et al. |
| 2005/0086260 A1* | 4/2005 | Canright et al. ........... 707/104.1 |
| 2005/0234880 A1* | 10/2005 | Zeng et al. ........................ 707/3 |
| 2005/0234952 A1* | 10/2005 | Zeng et al. ..................... 707/101 |
| 2005/0234973 A1* | 10/2005 | Zeng et al. ................ 707/103 R |
| 2005/0278325 A1* | 12/2005 | Mihalcea et al. ................. 707/6 |
| 2007/0239677 A1* | 10/2007 | Zhao et al. ........................ 707/3 |
| 2008/0071521 A1 | 3/2008 | Larvet |
| 2009/0012842 A1 | 1/2009 | Srinivasan |
| 2009/0204576 A1 | 8/2009 | Kolz et al. |
| 2010/0094910 A1* | 4/2010 | Bayliss ........................ 707/800 |
| 2010/0312769 A1* | 12/2010 | Bailey et al. .................. 707/740 |
| 2011/0137919 A1* | 6/2011 | Ryu et al. ..................... 707/748 |
| 2011/0184896 A1* | 7/2011 | Guyon ............................ 706/12 |
| 2012/0046992 A1* | 2/2012 | Hu et al. ...................... 705/7.29 |

OTHER PUBLICATIONS

Moon-Soo Chang et al., "An Extraction of Property of Ontology Instance Using Stratification of Domain Knowledge", Proceedings of Fuzzy and Intelligent System Conference, 2007, pp. 291-296, vol. 17, No. 3.

\* cited by examiner

APPARATUS AND METHOD FOR KNOWLEDGE GRAPH STABILIZATION

CROSS-REFERENCE(S) TO RELATED APPLICATION(S)

The present invention claims priority to Korean Patent Application No. 10-2009-0121578, filed on Dec. 9, 2009, which is incorporated herein by reference.

FIELD OF THE INVENTION

The present invention relates to an apparatus and method for stabilizing a knowledge graph; and, more particularly, to an apparatus and method for knowledge graph stabilization, which integrate a semantic relation between individuals extracted from non-structural and structural documents into a knowledge graph by using a graph analysis and statistical information, and stabilize the knowledge graph.

BACKGROUND OF THE INVENTION

Conventional technologies of generating a knowledge graph based on an extracted relation from structural and non-structural documents will be described below.

Firstly, there is a technology of modeling knowledge in the form of ontology. In this conventional technology, different kinds of centrality computation methods are proposed, and it is given how each method describes the core contents and structure of ontology. Further, it is described from a simple degree centrality to a complicate eigenvector centrality. This conventional technology presents a method of statistically analyzing a characteristic of network structure of ontology as a knowledge base.

Secondly, there is a property information extracting technology of an ontology instance through the hierarchy of domain knowledge. This technology is an algorithm of extracting properties of ontology instances from structural information already existing in web documents. In particular, a property extraction algorithm is improved by the hierarchy of the domain knowledge that is composed of property information, and thus the quality of extraction results becomes better. This conventional technology is to extract knowledge-based information from structured documents.

Thirdly, there is a technology used by computers to develop ontology in the text composed of natural language. In this technology, text data is received, and syntax and meaningful words are extracted from the text by a grammar analysis of the received data, and in the respective meaningful words of text, the definition sentence of a word is searched from an electronic dictionary. Further, syntax of the definition sentence and meaningful words are extracted, basic vocabulary graphs of the definition are generated based on the syntax of definition and the meaningful words, and at least two of the basic vocabulary graphs generated as a function of syntax of text are integrated to produce at least one semantic graph of text. In this text ontology development technology, relation between words represented in documents is not directly extracted, and relation among words is represented using the procedure of integrating graphs of word units. Also, a vocabulary similarity of entity is used when integrating the extracted relations into the knowledge graph.

Fourthly, there is a knowledge-based semiautomatic establishing technology for an encyclopedia question and answer system. In designing the knowledge-based structure, a concept-centered systematic template is designed based on the contents of encyclopedia, and important fact information relating to head words is automatically extracted from the summary information and text of encyclopedia. Then, a knowledge base of the question and answer system is established semi-automatically. The knowledge-based structure is designed based on templates for respective head words and their related properties, and the head words and their property names and property values are extracted from summary information of encyclopedia. Property names and property values for the head words are extracted from the text of encyclopedia on the basis of a dependency relation of a phrase-unit token sequence derived from sentence analysis, and structural information and non-structural information extracted per respective head word are stored in knowledge-based corresponding template and corresponding property. Therefore, the knowledge base is established. In this conventional technology, various kinds of qualification values for entry names in an encyclopedia entry are extracted from the entry text of encyclopedia and the summary information is produced.

Fifthly, there is a technology of automatically establishing ontology from non-structural web documents. This technology is to extract relation between concepts from non-structural documents and to automatically establish the ontology. Ontology instance, which is composed of relation between the concepts, is automatically extracted using pattern automatic learning and pattern automatic extending methods from non-structural web documents existing in the Internet and diverse information of database. Therefore, expenses necessary for establishing and managing ontology are reduced, and an information extraction performance for the establishment of ontology is continuously improved.

Sixthly, there is a technology of generating a knowledge graph by extracting the relation between terms. Further, a probability value is given to each of relations. Knowledge graphs and structured digital abstracts (SDAs) provide digitalized abstracts of texts. Terms for knowledge grapes and their relation are automatically extracted, and various kinds of methods and systems for the formation and visualization of knowledge grapes are provided. These graphs and abstracts can be used limitedly, but usefully, in various application systems, such as a semantic-based search for an electronic medical record search system, a specialized search for a specific domain such as newspaper, economy and history, and general Internet searches, etc. Such conventional technology is to represent in a graph structure by extracting relation between entities from the text.

Seventhly, there is a technology of establishing domain expert ontology to interpret the policy. A phrase decided as relating to the policy is received as an input. Indefinite terms are identified from the phrase. An Internet search is conducted using the indefinite terms extracted from the phrase. Latent substitute terms for the indefinite terms are extracted during the Internet search. Context-specialized ontology for the indefinite terms is generated based on the frequency number of the latent substitute terms. The policy is interpreted by accessing the domain expert ontology to interpret the indefinite terms. The indefinite terms are decided in their meaning by mapping the indefinite terms to the latent substitute terms included in ontology for contexts, and the policy is generated based on the interpretation for the indefinite terms from the ontology.

The conventional ontology establishing technologies as mentioned above are problematic in that they limit a target text to a specific domain, or limit text to structural information such as an entry of encyclopedia or a table of webpage, or simply integrate the relation extracted in a methodic aspect by using a vocabulary similarity of individuals or statistically analyze a graph structure of ontology.

SUMMARY OF THE INVENTION

In view of the above, the present invention provides an apparatus and method for knowledge graph stabilization, which are capable of reducing the loss of information by integrating relation between individuals extracted in non-structural and structural documents and thus of converting information into a knowledge graph of concise structure.

Further, the present invention provides an apparatus and method for knowledge graph stabilization, which are capable of eliminating error in a relation extraction procedure by an additional stabilizing method in a knowledge graph structure.

In accordance with an aspect of the present invention, there is provided a method for stabilizing a knowledge graph, including:

generating a knowledge graph in which same entities in a semantic relation list between entities provided as an input are represented as a single node based on names and types of the entities;

computing, on the knowledge graph, semantic similarities between all potential entity pairs of same entity types by comparing, for each potential entity pair, a type of relation associated with an entity in the entity pair and an opponent entity to the entity;

selecting, based on the semantic similarities, a representative entity from each of semantically similar entity pairs on the knowledge graph and integrating an opponent entity to the representative entity into the representative entity; and computing relation weighted values between the entities by using a graph analysis and statistic information, and adding the weighted values to the knowledge graph.

The method may further include eliminating, based on the relation weighted values and preset restriction condition on semantic relation types, a semantic relation with error in the knowledge graph.

Preferably, said generating the knowledge graph includes integrating the same entities in the semantic relation list to generate the knowledge graph; expressing on a relation node a first date and a last date of the same semantic relation by using dates of respective semantic relations in the knowledge graph; and computing a weighted sum of the same semantic relation in the semantic relation list, and representing the weighted sum on the knowledge graph.

Preferably, said computing the semantic similarities includes computing similarities of the entity pairs on a specific relation type basis; and integrating thus computed similarities of the entity pairs on the relation type basis to compute the semantic similarities.

Preferably, said selecting the representative entity includes selecting the representative entity by using a relative subsumption of the entity pair; and integrating, centering around the representative entity, relations associated with the entity pair.

Preferably, an entity having a relative subsumption of a low grade is selected as the representative entity.

Preferably, said computing the relation weighted values includes computing hub scores and authority scores of the entities by applying a hyperlink-induced topic search algorithm; and computing the relation scores between the entities by using the hub scores and authority scores.

Preferably, said computing the hub score and the authority scores of the entities is based on an assumption that all the semantic relations have a directionality from a subject to an object.

Preferably, said eliminating the semantic relation with error removes the semantic relation with error from the knowledge graph, based on the relation weighted values and entity cardinality of the semantic relation type.

Preferably, said eliminating the semantic relation with error removes the semantic relation with error from the knowledge graph, based on the relation weighted values, the entity cardinality of the semantic relation type and time information of the semantic relation.

In accordance with another aspect of the present invention, there is provided an apparatus for stabilizing a knowledge graph, including:

a knowledge graph generating unit for generating a knowledge graph in which same entities in a semantic relation list between entities provided as an input are represented as a single node based on names and types of the entities;

an entity similarity computing unit for computing, on the knowledge graph, semantic similarities between all potential entity pairs of same entity types by comparing, for each potential entity pair, a type of relation associated with an entity in the entity pair and an opponent entity to the entity;

a same entity integrating unit for selecting, based on the semantic similarities, a representative entity from each of semantically similar entity pairs on the knowledge graph and integrating an opponent entity to the representative entity into the representative entity; and a relation weighted value computing unit for computing relation weighted values between the entities by using a graph analysis and statistic information, and adding the weighted values to the knowledge graph.

The apparatus may further include a relation error eliminating unit for eliminating, based on the relation weighted values and preset restriction condition on semantic relation types, a semantic relation with error in the knowledge graph.

Preferably, the knowledge graph generating unit integrates the same entities in the semantic relation list to generate the knowledge graph, expresses on a relation node a first date and a last date of the same semantic relation by using dates of respective semantic relations in the knowledge graph, computes a weighted sum of the same semantic relation in the semantic relation list, and represents the weighted sum on the knowledge graph.

Preferably, the entity similarity computing unit computes similarities of the entity pairs on a specific relation type basis, and integrates thus computed similarities of the entity pairs on the relation type basis to compute the semantic similarities.

Preferably, the same entity integrating unit selects the representative entity by using a relative subsumption of the entity pair, and integrates, centering around the representative entity, relations associated with the entity pair.

Preferably, the same entity integrating unit selects an entity having a relative subsumption of a low grade as the representative entity.

Preferably, the relation weighted value computing unit computes hub scores and authority scores of the entities by applying a hyperlink-induced topic search algorithm, and computes the relation scores between the entities by using the hub scores and authority scores.

Preferably, the relation weighted value computing unit computes the hub score and the authority scores of the entities based on an assumption that all the semantic relations have a directionality from a subject to an object.

Preferably, the relation error eliminating unit removes the semantic relation with error from the knowledge graph, based on the relation weighted values and entity cardinality of the semantic relation type.

Preferably, the relation error eliminating unit removes the semantic relation with error from the knowledge graph, based on the relation weighted values, the entity cardinality of the semantic relation type and time information of the semantic relation.

Accordingly to the present invention, not only a relation list between entities is integrated into a knowledge graph on the basis of the name of entity simply, but also semantically similar entities are integrated by computing a semantic similarity between entities, thereby removing repeated entities and thus simplifying the structure of knowledge graph.

Further, relation error, which is difficult to be found in step of relation extraction between entities, is eliminated using a restriction condition of graph unit, thereby reducing error of knowledge graphs. Accordingly, in developing knowledge graph-based application programs, such as question and answer systems etc., accuracy and efficiency of the systems can be enhanced.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with the accompanying drawings, which form a part hereof.

Figure 1:
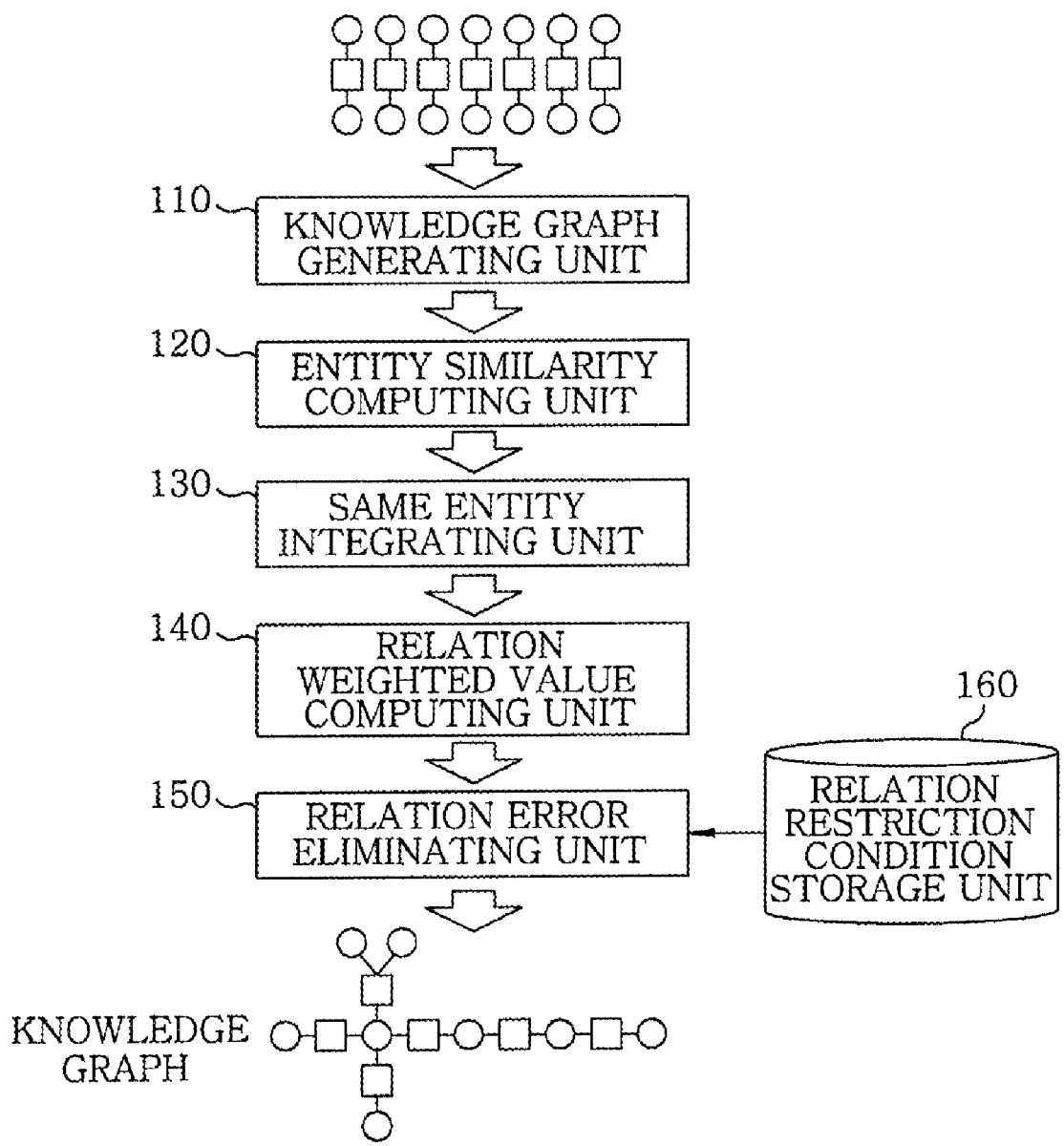
FIG. 1 is a block diagram of a knowledge graph stabilizing apparatus based on statistics and a graph analysis in accordance with an embodiment of the present invention.

FIG. 1 illustrates a block diagram of a knowledge graph stabilizing apparatus based on statistics and a graph analysis in accordance with an embodiment of the present invention.

The knowledge graph stabilizing apparatus shown in FIG. 1 includes a knowledge graph generating unit 110, an entity similarity computing unit 120, a same entity integrating unit 130, a relation weighted value computing unit 140, a relation error eliminating unit 150, and a relation restriction condition storage unit 160.

The knowledge graph generating unit 110 produces a knowledge graph in which the same entities are represented as one node, based on the names and types of the entities, from a semantic relation list between entities that are provided as an input. To this end, the same entities of the semantic relation list are integrated to produce a knowledge graph. A first date and a last date relating to the same meaning are represented in a relation node by using respective semantic relation dates in the produced knowledge graph. Further, a weighted sum of the same semantic relation is computed in the semantic relation list and is represented in the knowledge graph.

The entity similarity computing unit 120 computes a semantic similarity between all available entity pairs of the same entity type based on a comparison between a type of relation connected to the entity and its corresponding entity in the knowledge graph. For this, a similarity is computed for the entity pair on a specific relation type basis, and the similarities of entities are integrated and calculated on a relation type basis.

The same entity integrating unit 130 selects a representative entity from semantically similar entity pairs of the knowledge graph based on the computed semantic similarity, and integrates the rest entities in the representative entity. To this end, the representative entity is selected using a relative subsumption of the entity pairs, and relations to the entity pairs are integrated on the basis of the representative entity. Here, an entity having a relative subsumption of a low grade is selected as the representative entity.

The relation weighted value computing unit 140 computes a relation weighted value between entities by using a graph analysis and statistic information, and adds it to the knowledge graph. To this end, a hub score and an authority score of the entity are computed by applying a hyperlink-induced topic search (HITS) algorithm using a relation score between entities. The relation score between entities is calculated using the computed hub score and authority score. At this time, it is defined that all the semantic relations have directionality in the direction of from the subject to the object.

The relation error eliminating unit 150 removes a semantic relation with error from the knowledge graph based on the relation weighted value and restriction conditions of the predetermined semantic relation type in the relation restriction condition storage unit 160. To this end, firstly, semantic relations with error are removed from the knowledge graph based on the relation weighted value and entity cardinality of the semantic relation type. Secondly, semantic relations with error can be removed from the knowledge graph based on the relation weighted value, entity cardinality of the semantic relation type and time information of the semantic relation. Of these first and second error removing procedures, only any one may be selected, or two procedures may be all performed.

Hereinafter, a knowledge graph stabilizing method which is performed by the knowledge graph stabilizing apparatus in accordance with an embodiment of the present invention will be described with reference to FIGS. 2 to 10.

For the following description, an entity set E and a relation type set R are defined as in Equation 1.

$$E=\{e_i|1\leq i\leq L\}$$

$$e_i=(\text{entity name,entity type})$$

Example)

$$e=(\text{``NC\_DEVELOPER''},\text{OGG\_BUSINESS})$$

$$R=\{r_j|1\leq k\leq M\}$$

$$r_j=(\text{rel name},\text{type}(e_{subj}),\text{type}(e_{obj}),|e_{subj}|,|e_{obj}|)$$

|e|: upper bound on the number of entity $e$ in a given relation

Example)

$$r_j=(\text{``has\_ceo''},\text{OGG\_BUSINESS},\text{PERSON},N,N_{TIME\_UNIQUE})$$

$$r_k=(\text{``has\_product''},\text{OGG\_BUSINESS},\text{PRODUCT},1,N) \quad \text{Equation 1}$$

Here, $e_i$ indicates one entity and includes an entity name and entity type information. In one example, an entity e represents an entity having the name of an 'NC Developer' with an entity type of 'OGG_BUSINESS' (enterprise). It is assumed that the meaning of all entities included in an entity set E is unique in a corresponding name space. In other words, entities having different meanings are not expressed in the same name. R indicates a set of semantic relation types, and one semantic relation type $r_j$ represents a type of entity that may become a 'relation name', 'subject' or 'object', and indicates maximum cardinality information of the subject and the object. The maximum cardinality of entity provides the maximum number of entities that may appear as the object to one subject entity in a given relation type, or on the contrary, the maximum number of entities that may appear as the subject to one object entity. In the present invention, cardinality information is represented in three, 1, N, and $N_{TIME\_UNIQUE}$. "1" implies an allowance for only one entity, and "N" implies an allowance for multiple entities. "$N_{TIME\_UNIQUE}$" implies an allowance for multiple entities but for only one at the same time.

For example, in the relation of "has_ceo", an entity type of the 'subject' is 'OGG_BUSINESS'(enterprise), and an entity type of the 'object' is 'PERSON'. Further, one enterprise may have several owners, but at one moment it is one person, that is, several owners cannot exist at the same time. Also, one person can mange several enterprises. These facts are expressed as '$|e_{subj}|=N,|e_{obj}|=N_{TIME\_UNIQUE}$'. Further, in the relation of "has_product", an entity type of the 'subject' is 'OGG_BUSINESS', and an entity type of the 'object' is 'PRODUCT'. Also, one enterprise can produce several products, and one product can be produced by only one enterprise. These facts are expressed as '$|e_{subj}|=1,|e_{obj}|=N$'.

Furthermore, a separate semantic relation set SR is defined as shown in the following Equation 2. One $sr_i$ indicates that an actual entity is mapped to a semantic relation type r. $sr_i$ is composed of two entities corresponding to the subject $e_{subj}$ and the object $e_{obj}$, and three of basic elements as a semantic relation type $r_j$ of indicating a semantic relation between the two entities, and a semantic relation weighted value rel_weight, and a date. The semantic relation weighted value is normalized and assigned as a value of 0 to 1, which is given in relation extracting step, and may have different values depending upon relation extracting methods. Date represents a date on which the corresponding semantic relation is true, and in case definite date information can not be found, a date of generating a document from which the relation was extracted, is designated. If the document, from which the relation was extracted, is for newspaper articles, a date of corresponding newspaper articles is designated. In one example, a semantic relation of a "has_product" may be provided between an enterprise (OGG_BUSINESS) of an "NC Developer" and a product (PRODUCT) of a "PROGRAM 2", and a weighted value may be 0.0839, and a generation date of the document from which the relation is extracted may be "Jun. 12, 2007". In the same document or different documents, the same semantic relation can be extracted several times. That is, the same semantic relation may appear several times in the semantic relation list. Thus, the same semantic relation may have different weighted values and date information.

$$SR=\{sr_j|1\leq j\leq M\}$$

$$sr_j=(r_k,e_{subj},e_{obj},w,\text{date})$$

Here $$r_k \in R$$

$$e_{subj} \in E, e_{obj} \in E,$$

rel_weight:wheight of $sr_j$ date:date of $sr_j$ is verified as TRUE

Example)

("has_product",NC DEVELOPER:OGG_BUSINESS,
PROGRAM2:PRODUCT,rel_weight=0.08389,
date=2007/12/06) Equation 2

Figure 2:
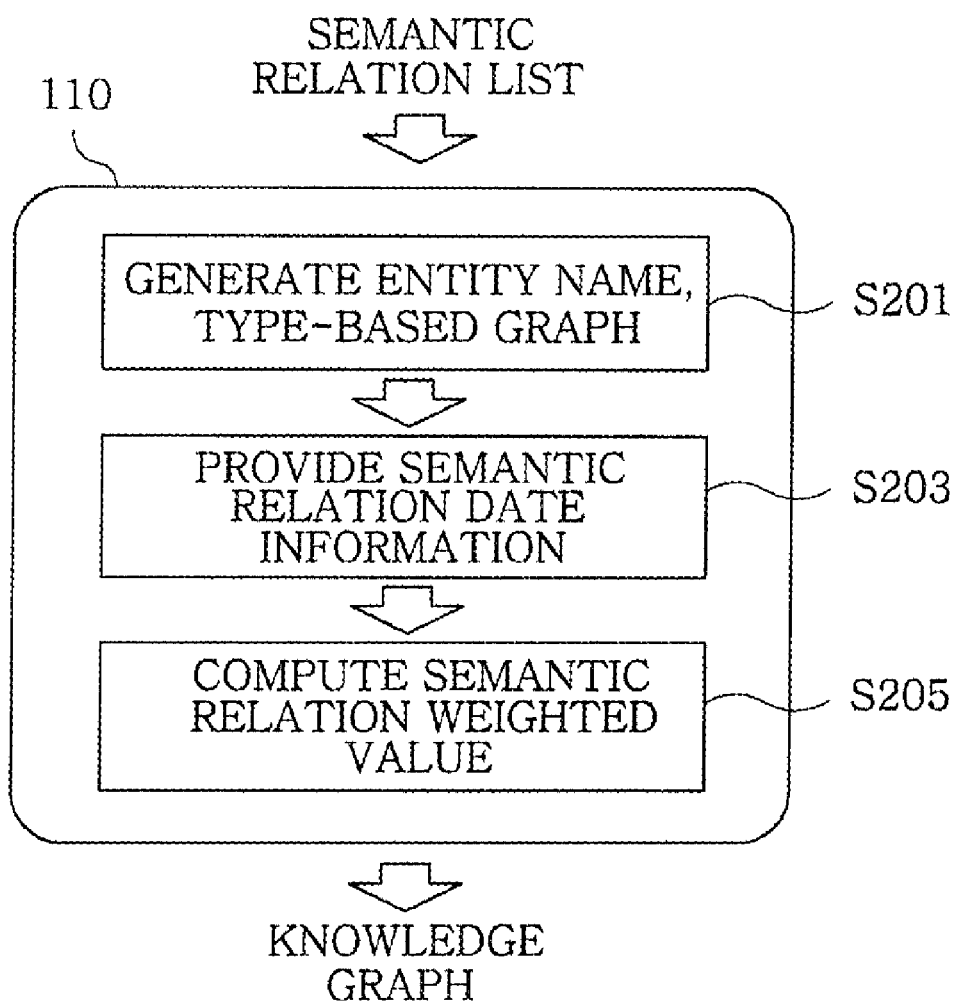
FIG. 2 shows a flowchart for explaining a portion of a method for stabilizing a knowledge graph in accordance with an embodiment of the present invention, which is performed by the knowledge graph generating unit that constitutes the knowledge graph stabilizing apparatus based on statistics and a graph analysis in accordance with an embodiment of the present invention.

FIG. 2 is a flowchart for explaining a portion of a method for stabilizing a knowledge graph in accordance with an embodiment of the present invention, which is performed by the knowledge graph generating unit 110 that constitutes the knowledge graph stabilizing apparatus based on statistics and a graph analysis in accordance with an embodiment of the present invention. And, FIG. 3 shows an example of an initial knowledge graph provided as the result of the knowledge graph generating unit 110.

The knowledge graph generating unit 110 receives a semantic relation list SR as an input, and generates an initial knowledge graph. In step S201 of "entity name, type-based graph generation", semantic relation lists are integrated on the basis of the name and type of entity and then converted into a knowledge graph. The same entities are integrated into one entity, and the same semantic relation for the same entities is expressed as only one. To distinguish the subject from the object in the semantic relation, an arrow is shown in the direction of from a subject side to an object side. In step S203 of "semantic relation date information provision", when at least one of the same semantic relation is included in SR, the most precedent date FIRST_DATE and the last date LAST_DATE are expressed at a relation node. In step S205 of "semantic relation weighted value computation", when at least one of the same semantic relation is included in SR, the weighted sum REL_WEIGHT of the same semantic relation is expressed.

Figure 3:
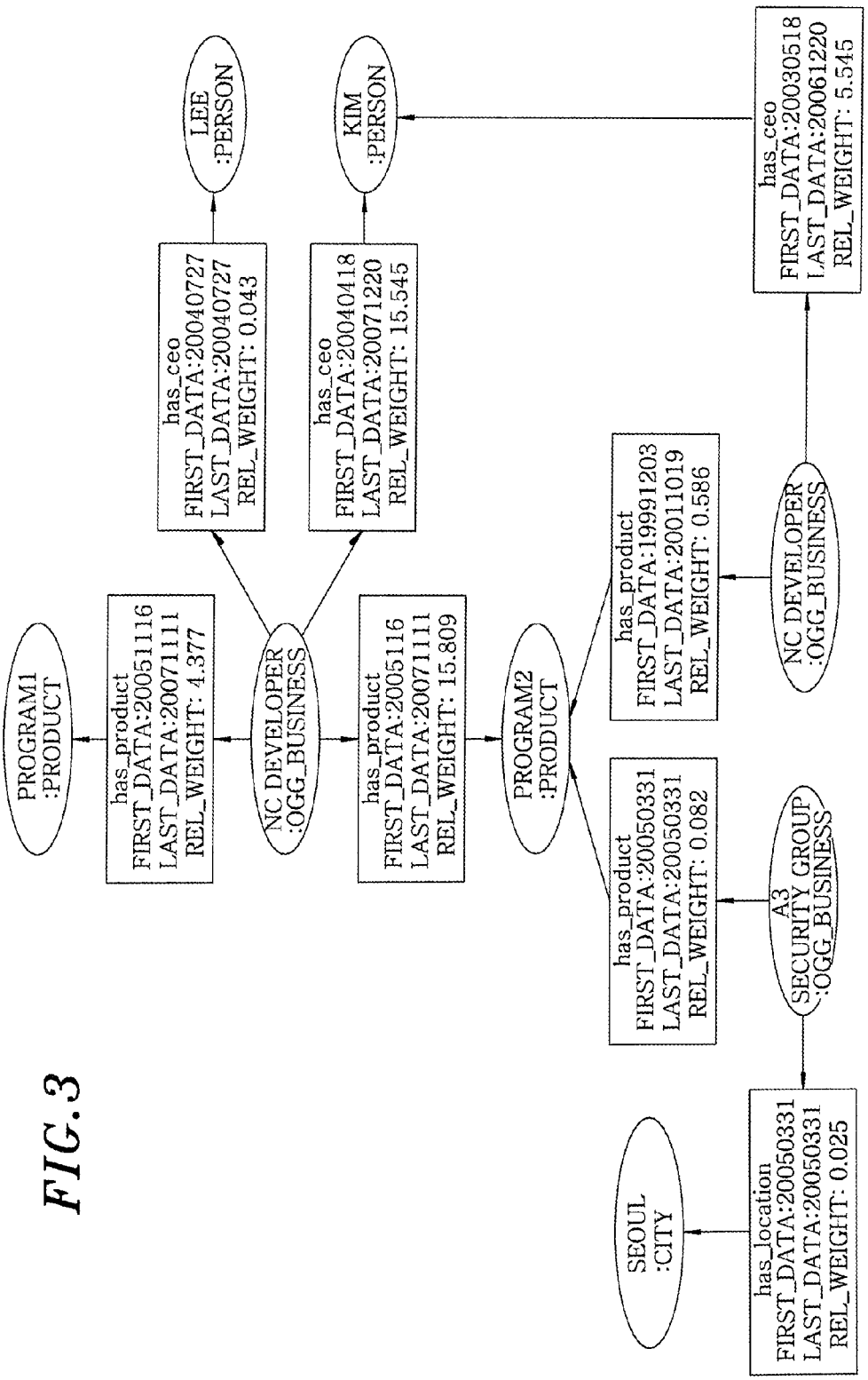
FIG. 3 presents an example of an initial knowledge graph provided as the result of the knowledge graph generating unit that constitutes the knowledge graph stabilizing apparatus based on statistics and a graph analysis in accordance with an embodiment of the present invention.

In FIG. 3, the circle indicates an entity, and a square indicates a semantic relation between entities. An entity "NC Developer: OGG_BUSINESS" has relation of "has_product" to "Program1:PRODUCT" and "Program2:PRODUCT". What a weighted value of (has_product, NC Developer: OGG_BUSINESS, Program2:PRODUCT) is higher than a weighted value of (has_product, NC Developer:OGG_BUSINESS, Program1:PRODUCT) means that "Program 2" is more representative among several products of "NC Developer". The "NC Developer:OGG_BUSINESS" is the entity having the same meaning as "NC Developer:OGG_BUSINESS", but they are used with different expressions, and thus are represented as separate entities. Then, the entity similarity computing unit 120 and the same entity integrating unit 130 recognize as the same entity and execute an entity integration.

Figure 4:
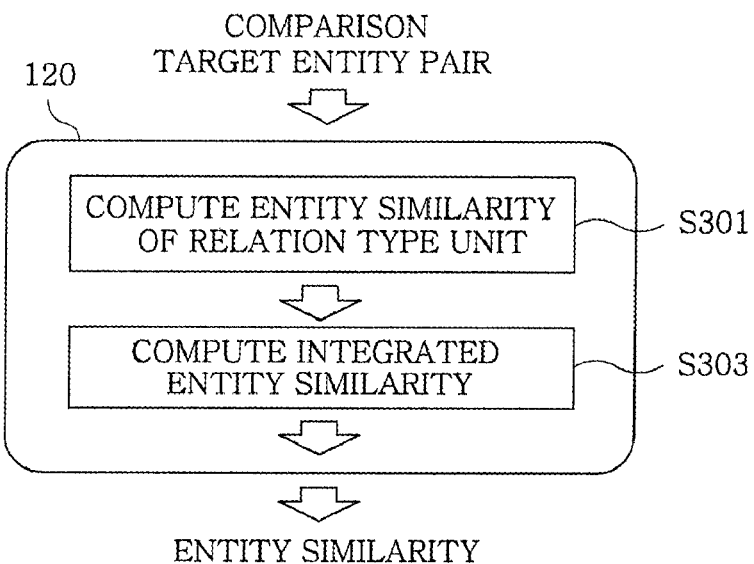
FIG. 4 illustrates a flowchart for explaining a portion of the method for stabilizing a knowledge graph in accordance with an embodiment of the present invention, which is performed by the entity similarity computing unit that constitutes the knowledge graph stabilizing apparatus based on statistics and a graph analysis in accordance with an embodiment of the present invention.

FIG. 4 is a flowchart for explaining a portion of the method for stabilizing a knowledge graph in accordance with an embodiment of the present invention, which is performed by the entity similarity computing unit 120 that constitutes the knowledge graph stabilizing apparatus based on statistics and a graph analysis in accordance with an embodiment of the present invention.

In performing a comparison for the same entity type of all available entity pairs by the entity similarity computing unit 120, the entity similarity $rsim(e_1, e_2, r)$ is calculated in units of all relation types associated with two entities to be compared by employing the following equation (3) thereto in step S301 of "relation type-unit entity similarity computation". In Equation 3, of entities coupled by the relation type r of two entities, one having lots of commonness obtains a high score.

$$rsim(e_1, e_2, r) = \frac{|E(e_1, r) \cap E(e_2, r)|}{|E(e_1, r) \cup E(e_2, r)|} \qquad \text{Equation 3}$$

$E(e, r)$: set of entities to which $e$ is connected using $r$

In step S303 of "integrated entity similarity computation", a similarity $esim(e_1, e_2, r)$ between entities is calculated using a mean value of similarity of relation units via the following Equation s. In Equation 4, a high score is obtained when the number of relation types that two entities have in common is many, and when having lots of connections to a common entity per relation type.

$$esim(e_1, e_2) = \frac{1}{|R(e_1) \cup R(e_2)|} \sum_{r \in R(e_1) \cup R(e_2)} rsim(e_1, e_2, r) \qquad \text{Equation 4}$$

$R(e)$: set of relation types where $e$ is involved

In FIG. 3, both "NC Developer:OGG_BUSINESS" and "NC Developer:OGG_BUSINESS" have the relation with other entities by using the relation type of "has_ceo" and "has_product". As a different point, "NC Developer:OGG_BUSINESS" additionally has "Program1:PRODUCT" as the object of "has_product", and additionally has "LEE:PERSON" as the object of "has_ceo". A similarity of two entities can be computed using Equations 3 and 4, as follows:

$$e_1 = NC \text{ Developer: OGG\_BUSINESS} \qquad \text{Equation 5}$$

$$e_2 = NC \text{ Developer: OGG\_BUSINESS}$$

$$R(e_1) = \{\text{has\_product, has\_ceo}\}$$

$$R(e_2) = \{\text{has\_product, has\_ceo}\}$$

$$E(e_1, \text{has\_product}) =$$

$$\{\text{PROGRAM1: PRODUCT, PROGRAM2: PRODUCT}\}$$

$$E(e_1, \text{has\_ceo}) = \{\text{LEE: PERSON, KIM: PERSON}\}$$

$$E(e_2, \text{has\_product}) = \{\text{PROGRAM2: PRODUCT}\}$$

$$E(e2, \text{has\_ceo}) = \{\text{KIM: PERSON}\}$$

$$rsim(e_1, e_2, \text{has\_product}) = \frac{1}{2}$$

$$rsim(e_1, e_2, \text{has\_ceo}) = \frac{1}{2}$$

-continued $$esim(e_1, e_2) = \frac{1}{2}(rsim(e_1, e_2, \text{has\_product}) + rsim(e_1, e_2, \text{has\_ceo}))$$

$$= \frac{1}{2} \cdot \left(\frac{1}{2} + \frac{1}{2}\right)$$

$$= \frac{1}{2}$$

A similarity of "NC Developer:OGG_BUSINESS" and "A3 Security Group:OGG_BUSINESS" in FIG. 3 may be computed using Equations 3 and 4, as follows:

$$e_1 = NC \text{ Developer: OGG\_BUSINESS} \qquad \text{Equation 6}$$

$$e_2 = A3 \text{ security group: OGG\_BUSINESS}$$

$$R(e_1) = \{\text{has\_product, has\_ceo}\}$$

$$R(e_2) = \{\text{has\_product, has\_location}\}$$

-continued $E(e_1, \text{has\_product}) = \{\text{PROGRAM2: PRODUCT}\}$ $E(e_1, \text{has\_ceo}) = \{\text{KIM: PERSON}\}$ $E(e_2, \text{has\_product}) = \{\text{PROGRAM2: PRODUCT}\}$ $E(e_2, \text{has\_location}) = \{\text{SEOUL: CITY}\}$ $rsim(e_1, e_2, \text{has\_product}) = 1$ $rsim(e_1, e_2, \text{has\_ceo}) = 0$ $$\begin{aligned} esim(e_1, e_2) &= \frac{1}{3}(rsim(e_1, e_2, \text{has\_product}) + rsim(e_1, e_2, \text{has\_ceo}) + rsim(e_1, e_2, \text{has\_location})) \\ &= \frac{1}{3} \cdot (1 + 0 + .0) \\ &= \frac{1}{3} \end{aligned}$$

Figure 5:
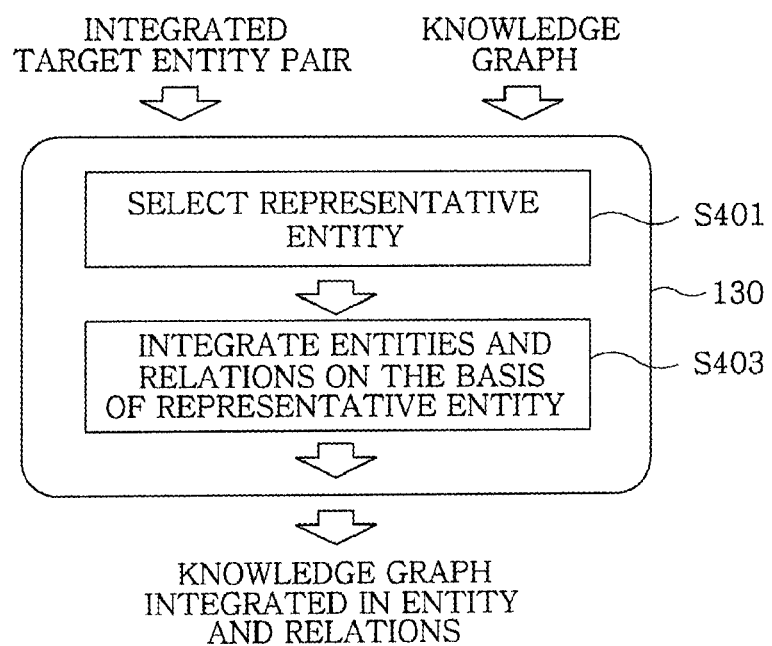
FIG. 5 illustrates a flowchart for explaining a portion of the method for stabilizing a knowledge graph in accordance with an embodiment of the present invention, which is performed by the same entity integrating unit that constitutes the knowledge graph stabilizing apparatus based on statistics and a graph analysis in accordance with an embodiment of the present invention.
Figure 6:
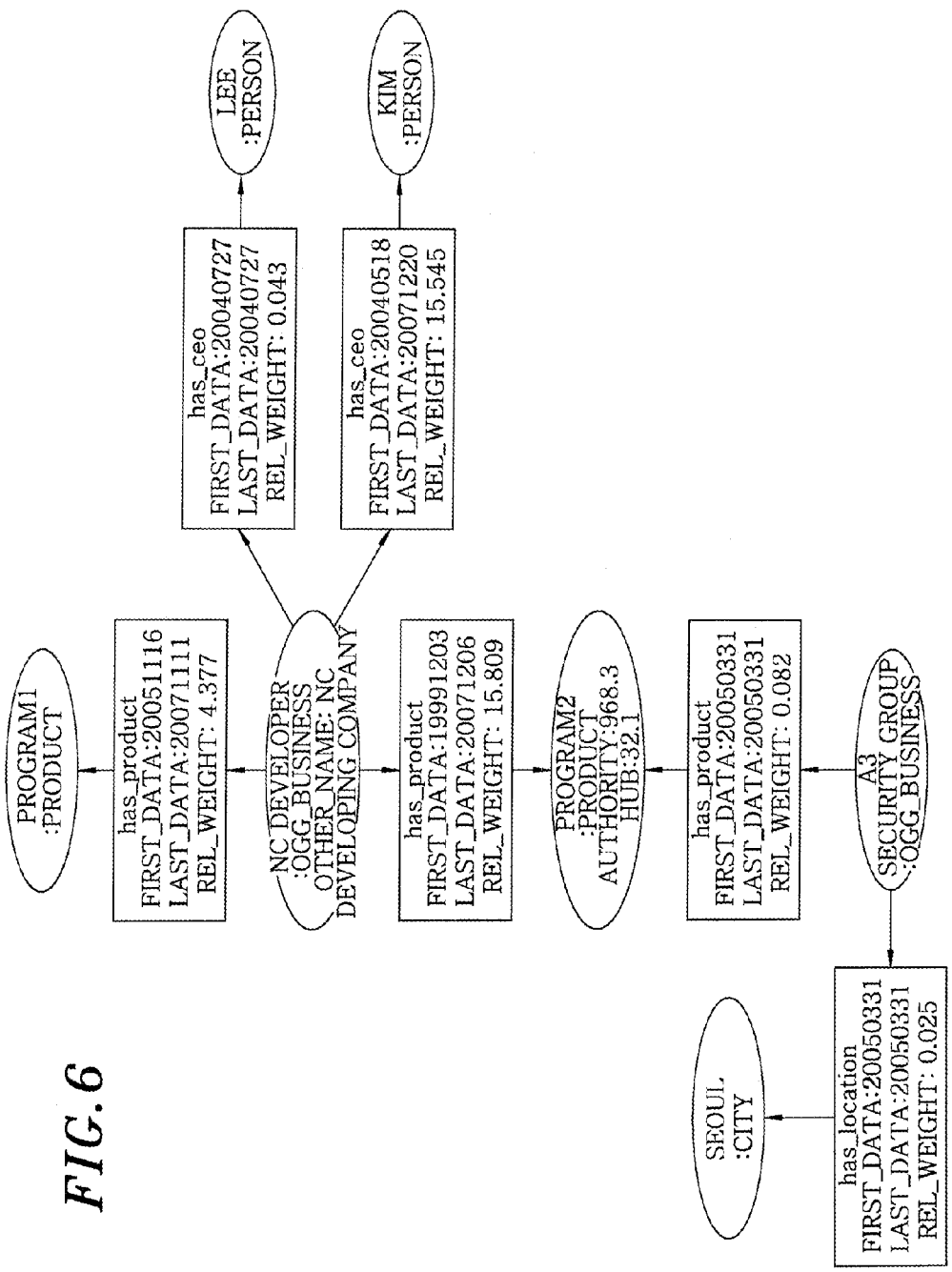
FIG. 6 depicts an example of an integrated knowledge graph as the result of the same entity integrating unit that constitutes the knowledge graph stabilizing apparatus based on statistics and a graph analysis in accordance with an embodiment of the present invention.

FIG. 5 is a flowchart for explaining a portion of the method for stabilizing a knowledge graph in accordance with an embodiment of the present invention, which is performed by the same entity integrating unit 130 that constitutes the knowledge graph stabilizing apparatus based on statistics and a graph analysis in accordance with an embodiment of the present invention. And FIG. 6 illustrates an example of an integrated knowledge graph as the result of the same entity integrating unit 130.

The same entity integrating unit 130 integrates the entity pair exceeding a threshold value, as one entity node in a knowledge graph, among entity similarity computed by the entity similarity computing unit 120. In step S401 of "representative entity selection", an entity, which has a relative subsumption of a low level among two entities $e_1$ and $e_2$ as the integrated target, is designated as a representative entity. A relative subsumption measure subsume($e_1, e_2$) between two entities represents an extent that $e_1$ is semantically included in $e_2$, and is computed using Equation 7 given below. In Equation 7, of entities coupled to $e_1$ in units of respective relation types, a ratio r_subsume($e_1, e_2, r$) of an entity, which is also coupled to $e_2$, is computed, and then a mean value is defined as an extent of relative subsumption of $e_1$ to $e_2$. When subsume($e_1, e_2$) is high, it means that many of entities coupled to $e_1$ are coupled to $e_2$ with the same relation type. When subsume ($e_1, e_2$) is higher than subsume($e_2, e_1$), $e_2$ is designated as a representative entity, and $e_1$ is designated as a dependent entity.

$$\text{r\_subsume}(e_1, e_2, r) = \frac{|E(e_1, r) \cap E(e_2, r)|}{E(e_1, r)} \quad \text{Equation 7}$$

$$\text{subsume}(e_1, e_1) = \frac{1}{|R(e_1)|} \sum_{r \in R(e_1)} \text{r\_subsume}(e_1, e_2, r)$$

A relative subsumption extent of "NC Developer:OGG_BUSINESS" and "NC Developer:OGG_BUSINESS" in FIG. 3 can be computed using Equation 7, as in the following Equation 8. As a result, the extent that "NC Developer:OGG_BUSINESS" is included in "NC Developer:OGG_BUSINESS" is 0.5, and to the contrary, the extent that "NC Developer:OGG_BUSINESS" is included in "NC Developer:OGG_BUSINESS" is 1.0. "NC Developer:OGG_BUSINESS" is designated as a representative entity, and "NC Developer:OGG_BUSINESS" is designated as a dependent entity.

$$\begin{aligned} e_1 &= NC \text{ Developer: OGG\_BUSINESS} \\ e_2 &= NC \text{ Developer: OGG\_BUSINESS} \\ R(e_1) &= \{\text{has\_product, has\_ceo}\} \\ R(e_2) &= \{\text{has\_product, has\_ceo}\} \end{aligned} \quad \text{Equation 8}$$

$E(e_1, \text{has\_product}) = \{\text{PROGRAM1: PRODUCT, PROGRAM2: PRODUCT}\}$ $E(e_1, \text{has\_ceo}) = \{\text{LEE: PERSON, KIM: PERSON}\}$ $E(e_2, \text{has\_product}) = \{\text{PROGRAM2: PRODUCT}\}$ $E(e_2, \text{has\_ceo}) = \{\text{KIM: PERSON}\}$ $\text{r\_subsume}(e_1, e_2, \text{has\_product}) = \frac{1}{2}$ $\text{r\_rsim}(e_1, e_2, \text{has\_ceo}) = \frac{1}{2}$ $$\begin{aligned} \text{subsume}(e_1, e_2) &= \frac{1}{2}(\text{r\_subsume}(e_1, e_2, \text{has\_product}) + \text{r\_subsume}(e_1, e_2, \text{has\_ceo})) \\ &= \frac{1}{2} \cdot \left(\frac{1}{2} + \frac{1}{2}\right) \\ &= \frac{1}{2} \end{aligned}$$

-continued r_subsume($e_2$, $e_1$, has_product) = 1 r_subsume($e_2$, $e_1$, has_ceo) = 1

$$subsume(e_2, e_1) = \frac{1}{2}(\text{r\_subsume}(e_2, e_1, \text{has\_product}) + \text{r\_subsume}(e_2, e_1, \text{has\_ceo}))$$

$$= \frac{1}{2} \cdot (1 + 1)$$

$$= 1$$

In step S403 of "entity and relation integration on the basis of representative entity", a dependent entity is integrated into a representative entity in the knowledge graph. The name of the dependent entity is added to an item of "OTHER_NAME" in the representative entity. In an item of "FIRST_DATE" of integrated relation, a former date among dates of two relations is recorded, and in an item of "LAST_DATE", a latter date among dates of two relations is recorded. FIG. 6 illustrates a knowledge graph after an integration of "NC Developer:OGG_BUSINESS" of FIG. 3 into "NC Developer:OGG_BUSINESS". "NC Developer" is added to "OTHER_NAME" of "NC Developer:OGG_BUSINESS". FIRST_DATE and LAST_DATE of (has_product, NC Developer:OGG_BUSINESS, Program2:PRODUCT) relation are respectively assigned with low value and high value, in comparison with FIRST_DATE and LAST_DATE of (has_product, NC Developer:OGG_BUSINESS, Program2:PRODUCT) relation. Similarly, items of FIRST_DATE and LAST_DATE of (has_ceo, NC Developer:OGG_BUSINESS, KIM:PERSON) are also respectively assigned with low value and high value, in comparison with items of FIRST_DATE and LAST_DATE of (has_ceo, NC Developer:OGG_BUSINESS, KIM:PERSON).

Figure 7:
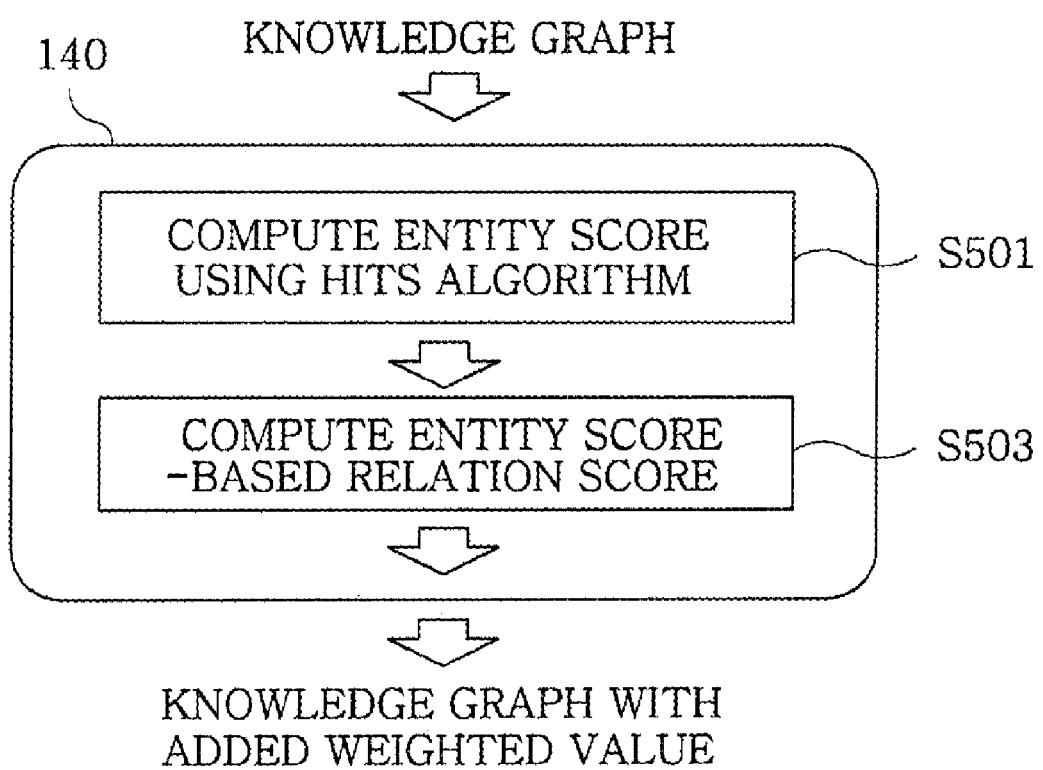
FIG. 7 offers a flowchart for explaining a portion of the method for stabilizing a knowledge graph in accordance with an embodiment of the present invention, which is performed by a relation weighted value computing unit that constitutes the knowledge graph stabilizing apparatus based on statistics and a graph analysis in accordance with an embodiment of the present invention.
Figure 8:
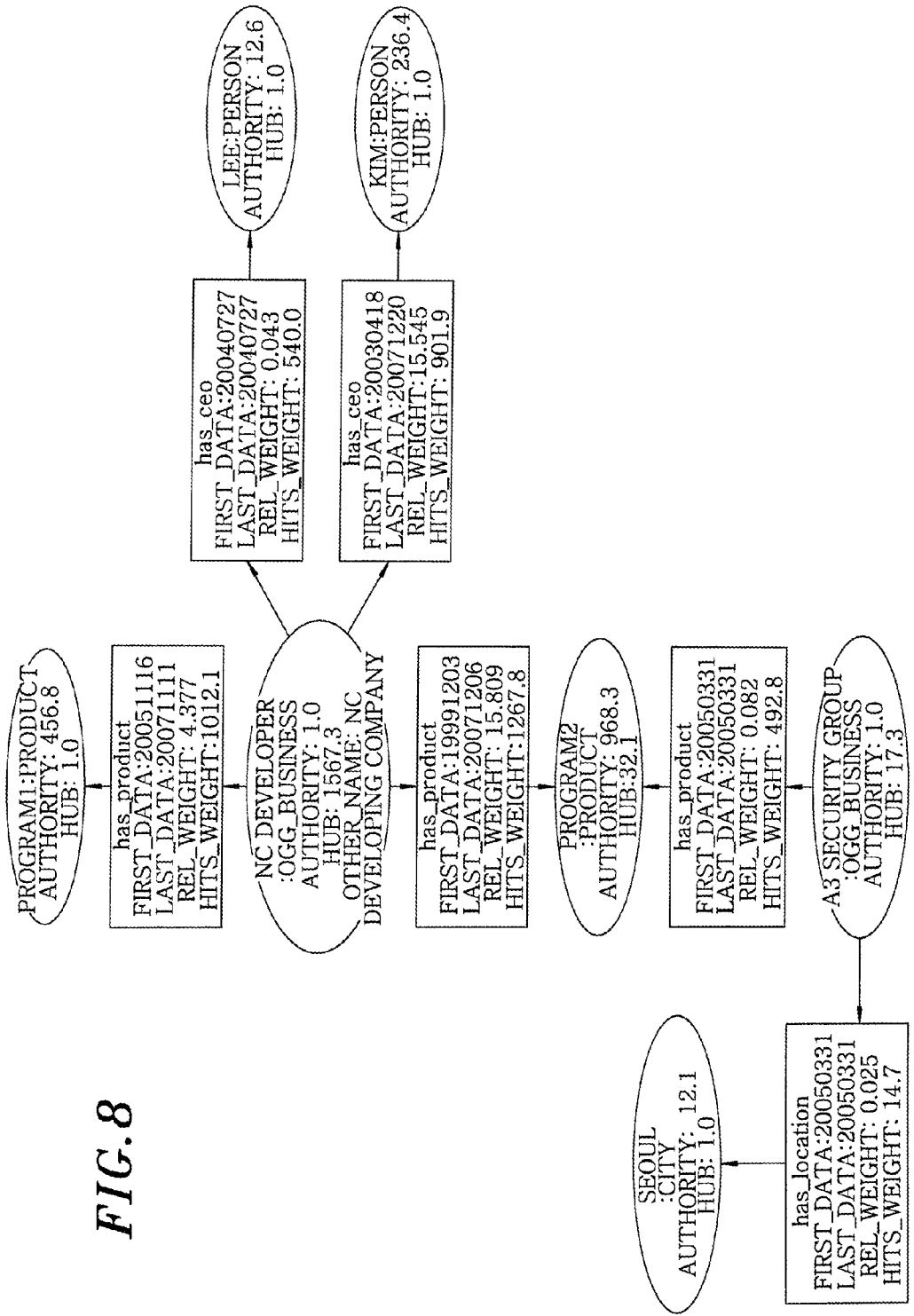
FIG. 8 shows an example of a knowledge graph with added weighted value as the result of the relation weighted value computing unit constituting the knowledge graph stabilizing apparatus based on statistics and a graph analysis in accordance with an embodiment of the present invention.

FIG. 7 is a flowchart for explaining a portion of the method for stabilizing a knowledge graph in accordance with an embodiment of the present invention, which is performed by the relation weighted value computing unit 140 that constitutes the knowledge graph stabilizing apparatus based on statistics and a graph analysis in accordance with an embodiment of the present invention. FIG. 8 illustrates an example of a knowledge graph with added weighted value as the result of the relation weighted value computing unit 140.

The relation weighted value computing unit 140 computes the degree of importance of the relation by applying "weighted value-based HITS algorithm" amended from an HITS algorithm that computes the degree of importance of a web page by using link information between web pages. First, in step S501 of "entity score computation using HITS algorithm", authority score of the entity and hub score are computed using the HITS algorithm. The HITS algorithm is a method for computing a weighted value of node by using link information between nodes in a graph structure. All the nodes have an authority score and a hub score, and update scores by referring to link information mutually and repetitively. To apply this algorithm thereto, all relations are defined as being a directionality of from the subject to the object in the knowledge graph proposed by the present invention. As shown in the following Equation 9, the authority of any entity is computed using a relation weighted value and a hub score of its corresponding entity having all other relations entering that entity. Further, the hub score of entity is computed using a relation weighted value and an authority score of its corresponding entity having relation of going out of that entity for the hub score. The authority score of entity becomes increased when the number of relations entering into the entity itself gets more increased and the relation weighted value gets more heightened. The hub score of entity becomes increased when the number of relations going out of the entity itself gets more increased and the relation weighted value gets more heightened.

$$Autority(e_i) = \sum_{e_j \in In(e_i)} W_{ji} \cdot \text{Hub}(e_j)$$

$$\text{Hub}(e_i) = \sum_{e_j \in Out(e_i)} W_{ij} \cdot \text{Authority}(e_j)$$

Equation 9

In($e_i$): Set of the subject *Entiry* in all semantic relations that *entiry* $e_i$ is the object Out($e_i$): Set of the *oubject* Entiry in all semantic relations that entiry $e_i$ is the subject $W_{ji}$: Semantic relation weighted value between entity $e_i$ and $e_j$ In step S503 of "entity score-based relation score computation", HITS_WEIGHT of a semantic relation is computed by a hub score of the 'subject' included in a semantic relation and an arithmetical mean of an authority score of the object, as shown in the following Equation 10. FIG. 8 shows that the authority score and the hub score are added to each entity in the knowledge graph of FIG. 6, and HITS_WEIGHT is added to the relation.

$$\text{HITS\_Weight}(sr_i) = \frac{\text{Hub}(e_{subj}) + \text{Authority}(e_{obj})}{2}$$

Equation 10

Figure 9:
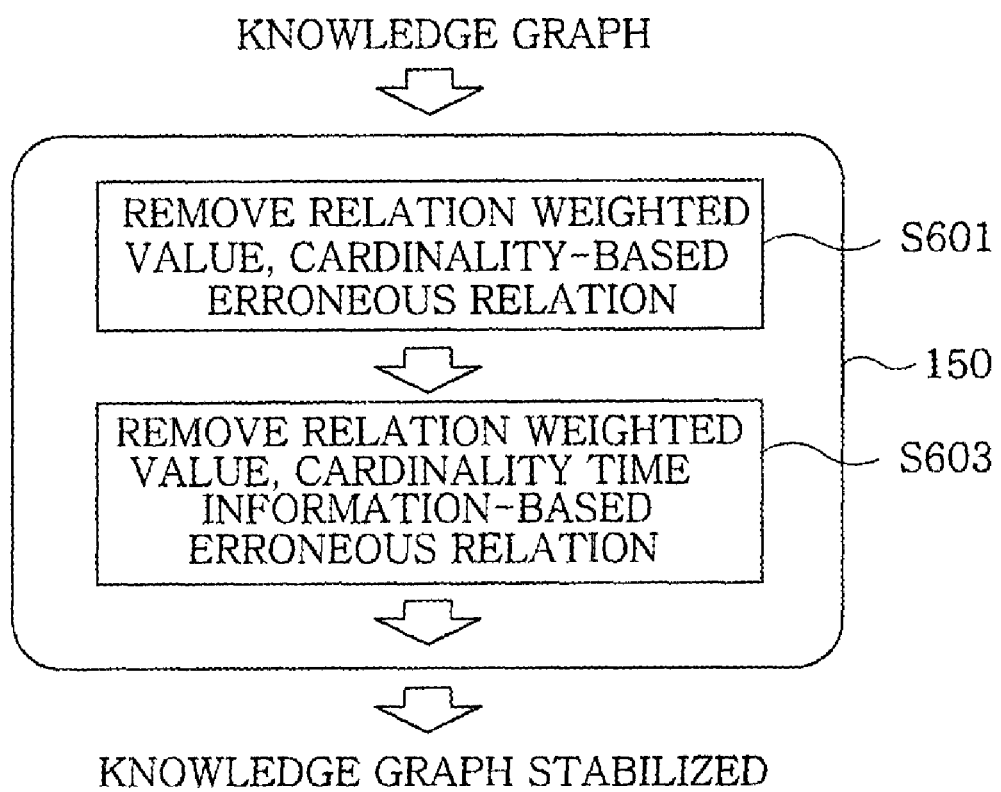
FIG. 9 illustrates a flowchart for explaining a portion of the method for stabilizing a knowledge graph in accordance with an embodiment of the present invention, which is performed by the relation error eliminating unit that constitutes the knowledge graph stabilizing apparatus based on statistics and a graph analysis in accordance with an embodiment of the present invention.
Figure 10:
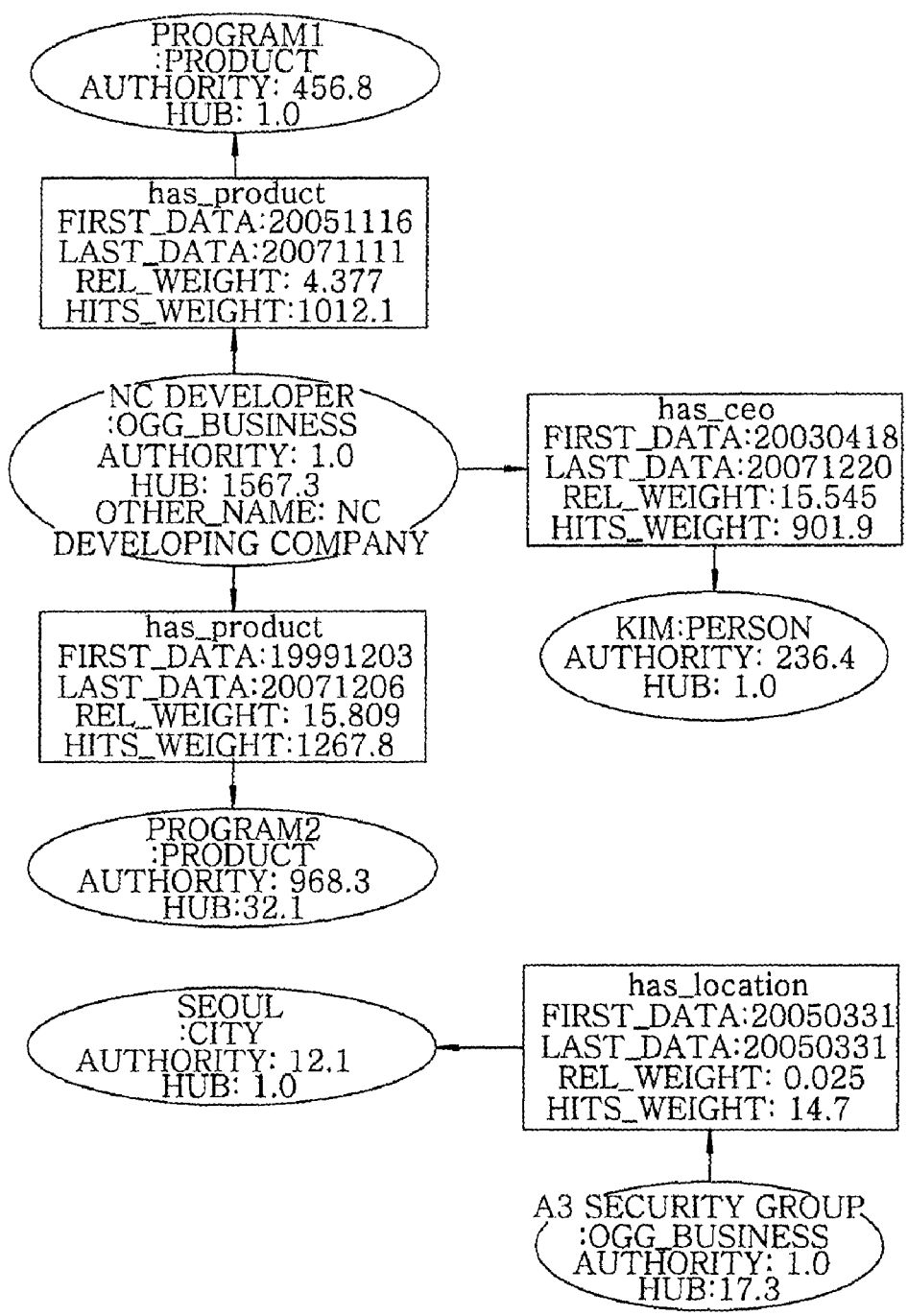
FIG. 10 shows an example of a knowledge graph obtained by removing an erroneous relation as the result of the relation error eliminating unit that constitutes the knowledge graph stabilizing apparatus based on statistics and a graph analysis in accordance with an embodiment of the present invention.

FIG. 9 is a flowchart for explaining a portion of the method for stabilizing a knowledge graph in accordance with an embodiment of the present invention, which is performed by a relation error eliminating unit 150 that constitutes the knowledge graph stabilizing apparatus based on statistics and a graph analysis in accordance with an embodiment of the present invention. FIG. 10 illustrates an example of a knowledge graph by removing an erroneous relation as the result of the relation error eliminating unit 150.

In an assumption that there may occur error in a semantic relation list input to the stabilizing apparatus of the present invention in relation extracting step, the relation error eliminating unit 150 eliminates relations with error by using a weighted value of semantic relation of knowledge graph computed in the previous component or step, and a cardinality restriction condition of a semantic relation type stored in the relation restriction condition storage unit 160.

In step S601 of "relation weighted value and cardinality-based erroneous relation elimination", in FIG. 8, "program2: PRODUCT" has the relation of "has_product" to two entities of "NC Developer:OGG_BUSINESS" and "A3 Security Group:OGG_BUSINESS". In an example of Equation 1 and in the relation of "has_product", one enterprise (OGG_BUSINESS) can produce several products (PRODUCT), and on the contrary, one product must be produced by one enterprise only. Of manufacturing companies of two "Program2:PRODUCT" represented in FIG. 8, one is selected, and the rest one is deleted. A standard of selection is to keep only relation having a highest weighted value remain and to delete the rest ones by using "REL_WEIGHT" or "HITS_WEIGHT" expressed in the relation.

As another example, in step S603 of "relation weighted value, cardinality, time information-based erroneous relation elimination", the relation of "has_ceo" in Equation 1 has a restriction condition that one company may have several chief executive officers (CEOs), but only one CEO for the same period. In FIG. 8, "NC Developer:OGG_BUSINESS" has the relation of "has_ceo" with two entities of "KIM:PERSON" and "LEE:PERSON". This is all allowed unless two entities do not have the relation of "has_ceo" with "NC Developer: OGG_BUSINESS" for the same period. However, in this example, with reference to values of "FIRST_DATE" and "LAST_DATE" with the relation of "has_ceo", two entities fall on the same period for CEO of "NC Developer:OGG_BUSINESS". In this case, relation having a low weighted value is eliminated using "REL_WEIGHT" or "HIST_WEIGHT" expressed in the relation. FIG. 10 illustrates a knowledge graph obtained by removing an erroneous relation from the knowledge graph of FIG. 8.

While the invention has been shown and described with respect to the particular embodiments, it will be understood by those skilled in the art that various changes and modification may be made.

What is claimed is:

1. A method for stabilizing a knowledge graph, the method comprising:
generating the knowledge graph in which same entities in a semantic relation list of entities provided as an input are represented as a single node based on names and types of the entities;
computing, on the knowledge graph, semantic similarities between available entity pairs of same entity types by comparing, for each available entity pair, a type of relation associated with a first entity in the entity pair and a type of relation associated with a second entity in the entity pair;
selecting, based on the semantic similarities, a representative entity from each of semantically similar entity pairs on the knowledge graph and integrating an entity; that is not selected as the representative entity; into the representative entity; and
computing relation weighted values between the entities by using a graph analysis and statistical information, and adding the relation weighted values to the knowledge graph.

2. The method of claim 1, further comprising:
eliminating, based on the relation weighted values and a preset restriction condition on semantic relation types, a semantic relation with error from the knowledge graph.

3. The method of claim 1, wherein the generating of the knowledge graph includes:
integrating the same entities in the semantic relation list to generate the knowledge graph;
expressing, on a relation node, a first date and a last date of the same semantic relation by using dates of respective semantic relations in the knowledge graph; and computing a weighted sum of the same semantic relation in the semantic relation list, and representing the weighted sum on the knowledge graph.

4. The method of claim 1, wherein the computing of the semantic similarities includes:
computing similarities of the entity pairs based on a specific relation type; and
integrating the similarities of the entity pairs based on the relation type to compute the semantic similarities.

5. The method of claim 1, wherein the selecting of the representative entity includes:
selecting the representative entity by using a relative subsumption between entities in each entity pair; and
integrating relations associated with the entity pair around the representative entity.

6. The method of claim 5, wherein an entity having a relative subsumption of a low grade is selected as the representative entity.

7. The method of claim 1, wherein the computing of the relation weighted values includes:
computing hub scores and authority scores of the entities by applying a hyperlink-induced topic search algorithm; and
computing the relation weighted values between the entities by using the hub scores and the authority scores.

8. The method of claim 7, wherein the computing of the hub scores and the authority scores of the entities is performed based on an assumption that all the semantic relations have a directionality from a subject to an object.

9. The method of claim 2, wherein the eliminating of the semantic relation with error comprises removing the semantic relation with error from the knowledge graph based on the relation weighted values and entity cardinality of the semantic relation type.

10. The method of claim 2, wherein the eliminating of the semantic relation with error comprises removing the semantic relation with error from the knowledge graph based on the relation weighted values, entity cardinality of the semantic relation type, and time information of the semantic relation.

11. A Non-transitory computer readable storage medium having a computer program for causing a computer to stabilize a knowledge graph, the computer readable medium comprising:
code for a knowledge graph generating unit, the knowledge graph generating unit being operable to generate the knowledge graph in which same entities in a semantic relation list of entities provided as an input are represented as a single node based on names and types of the entities;
code for an entity similarity computing unit, the entity similarity computing unit being operable to compute, on the knowledge graph, semantic similarities between available entity pairs of same entity types by comparing, for each available entity pair, a type of relation associated with one entity in the entity pair and that of the other entity in the entity pair;

code for a same entity integrating unit, the same entity integrating unit being operable to select, based on the semantic similarities, a representative entity from each of semantically similar entity pairs on the knowledge graph and integrate an entity that is not selected as the representative entity into the representative entity; and code for a relation weighted value computing unit, the relation weighted value computing unit being operable to compute relation weighted values between the entities by using a graph analysis and statistical information, and add the relation weighted values to the knowledge graph.

12. The non-transitory computer readable storage medium of claim 11, further comprising:

code for a relation error eliminating unit, the relation error eliminating unit being operable to eliminate, based on the relation weighted values and preset restriction condition on semantic relation types, a semantic relation with error from the knowledge graph.

13. The non-transitory computer readable storage medium of claim 11, wherein the knowledge graph generating unit is operable to integrate the same entities in the semantic relation list to generate the knowledge graph, express on a relation node a first date and a last date of the same semantic relation by using dates of respective semantic relations in the knowledge graph, compute a weighted sum of the same semantic relation in the semantic relation list, and represent the weighted sum on the knowledge graph.

14. The non-transitory computer readable storage medium of claim 11, wherein the entity similarity computing unit is operable to compute similarities of the entity pairs based on a specific relation type, and integrate the similarities of the entity pairs based on the relation type to compute the semantic similarities.

15. The non-transitory computer readable storage medium of claim 11, wherein the same entity integrating unit is operable to select the representative entity by using a relative subsumption between entities in each entity pair, and integrate relations associated with the entity pair around the representative entity.

16. The non-transitory computer readable storage medium of claim 15, wherein the same entity integrating unit is operable to select an entity having a relative subsumption of a low grade as the representative entity.

17. The non-transitory computer readable storage medium of claim 11, wherein the relation weighted value computing unit is operable to compute hub scores and authority scores of the entities by applying a hyperlink-induced topic search algorithm, and compute the relation weighted values between the entities by using the hub scores and the authority scores.

18. The non-transitory computer readable storage medium of claim 17, wherein the relation weighted value computing unit is operable to compute the hub score and the authority scores of the entities based on an assumption that all the semantic relations have a directionality from a subject to an object.

19. The non-transitory computer readable storage medium of claim 12, wherein the relation error eliminating unit is operable to remove the semantic relation with error from the knowledge graph based on the relation weighted values and entity cardinality of the semantic relation type.

20. The non-transitory computer readable storage medium of claim 12, wherein the relation error eliminating unit is operable to remove the semantic relation with error from the knowledge graph based on the relation weighted values, entity cardinality of the semantic relation type, and time information of the semantic relation.

* * * * *